United States Patent [19]

Ponjee

[11] Patent Number: 4,584,156
[45] Date of Patent: Apr. 22, 1986

[54] MOLD AND METHOD OF MANUFACTURING POLYURETHANE PRODUCTS

[75] Inventor: Johannes J. Ponjee, Eindhoven, Netherlands

[73] Assignee: U.S. Philips Corporation, New York, N.Y.

[21] Appl. No.: 737,995

[22] Filed: May 28, 1985

[30] Foreign Application Priority Data

Jun. 18, 1984 [NL] Netherlands ........................ 8401922

[51] Int. Cl.⁴ ........................ B29C 33/60; B29C 67/20
[52] U.S. Cl. .................................... 264/263; 249/115; 264/46.4; 264/46.6; 264/46.7; 264/53; 264/54; 264/268; 264/338; 427/135
[58] Field of Search ......... 264/300, 338, 54, DIG. 77, 264/46.4, 46.7, 51, 53, 263, 268; 249/115; 427/135; 568/18, 61

[56] References Cited

U.S. PATENT DOCUMENTS 4,419,719 12/1983 Boer et al. ........................ 362/218

FOREIGN PATENT DOCUMENTS 2035194 6/1980 United Kingdom .

Primary Examiner—James Lowe
Assistant Examiner—Leo Tentoni
Attorney, Agent, or Firm—Norman N. Spain

[57] ABSTRACT

In order to facilitate the release of polyurethane from a steel or aluminium mould, the metal surface is provided with a mono-layer of an alkylmercaptan. A silver layer may be provided between the mould metal and the alkylmercaptan monolayer.

The invention can be advantageously used for manufacturing a luminaire for a tubular discharge lamp.

6 Claims, 3 Drawing Figures

MOLD AND METHOD OF MANUFACTURING POLYURETHANE PRODUCTS

The invention relates to a mould which is suitable for manufacturing products, the surface of which products consists at least partly of polyurethane, at least that part of the mould surface which contacts the polyurethane consisting of a metal and being provided with a release agent.

The invention also relates to a method of manufacturing shaped polyurethane products, in which method a urethane forming mixture is introduced into a mould and is reacted to form polyurethane, the mould comprising metal parts which are provided with a release agent.

A mould and a method of manufacturing products of polyurethane are known from British Patent Specification GB Pat. No. 2,035,194. In this specification, the mould is provided with two layers to facilitate the release operation, that is to say, in succession, a metal coating having homogeneously distributed therein polyfluorocarbon and a coating of a polyfluorocarbon. Suitable metals for forming the coating include nickel, cobalt, silver, gold, platinum, copper, zinc and chromium. Preferably, the polyfluorocarbon is polytetrafluoroethylene or a copolymer of tetrafluoroethylene and hexafluoropropylene. The metal coating may be applied by means of an electro-deposition process and has a thickness of, for example, 20 to 30 μm. The second coating has a thickness of, for example, 10 μm.

The invention has for its object to provide a mould and a method of manufacturing polyurethane products in which an agent for "multiple" mould release, which can be applied without difficulty, is used and the coating of which has a small thickness (preferably less than 1 μm).

According to the invention, this object is accomplished by using a mould and a method, in which the release agent comprises a monolayer of an alkylmercaptan.

The molecules of the alkylmercaptan are anchored to and directionally arranged on the metal mould surface, the sulphur atoms of the compounds being bound to the metal surface. The alkylgroups extend outwardly from the metal surface. This modifies the metal surface to an immobile, quite inert surface. In the resultant protective layer of alkylgroups there are not polar groups or other reactive elements, so that it is not possible to bond a second or subsequent layer to the first layer of the alkylmercaptan. Thus, the alkylmercaptan layer is a real monolayer, the thickness of which corresponds to the dimensions of the molecule. When using, for example, octadecylmercaptan the layer thickness is about 3 nm (18 C-atoms thick).

The monolayer of alkylmercaptan is applied by dissolving the compound in a suitable organic solvent such as toluene or hexane. Preferably, the concentration of the mercaptan compound in the solution is low, for example 2 to 20 grams per liter of solvent. The viscosity of the solution is low. The dynamic viscosity is, for example, about $6.10^{-4}$ Pa.s at 20° C. The mould is immersed in the solution. Naturally, it is alternatively possible to spray the solution onto the mould surface. Subsequently, the mould or the mould surface is rinsed with the solvent in order to remove the remainder of the solution and of unbound alkylmercaptan molecules. Partly as a result of the relatively high mobility and the relatively small molecular size of the mercaptan compounds used, as compared to, for example, polymeric substances, a suitable distribution of the mercaptan molecules over the metal surface is obtained. The monolayer obtained has a close molecular spacing, consequently the metal surface of the mould is optimally modified and hence protected.

Generally, a mould is completely manufactured from a metal. Examples of suitable metals are nickel, steel and aluminium. In order to obtain a better bonding of the alkylmercaptan, it is effective that at least the part of the steel or aluminium surface which contacts the polyurethane is covered with, in succession, a silver layer and a monolayer of the alkylmercaptan.

In a preferred embodiment of the mould according to the invention, an alkylmercaptan is used whose alkyl group comprises at least 12 carbon atoms. Generally, the alkyl group does not comprise more than 20 carbon atoms. The term alkyl or alkyl group is to be understood to include a branched alkyl or a branched alkyl group. In a particular embodiment of a mould and a method according to the invention, octadecylmercaptan is used as a release agent. Examples of other compounds which are suitable for use as the release agents of the invention are dodecylmercaptan and hexadecylmercaptan.

The invention also releates to a method of manufacturing a luminaire for a tubular discharge lamp, in which an elongate, thin-walled housing having a substantially U-shaped cross-section is provided with electric components and wiring, whereupon the housing is filled with a urethane-forming mixture and closed by means of a mould; in the resulting enclosed space the urethane-forming mixture will react to form a poly-urethane, after which the mould is removed from the housing. With this method it is possible to first fill the housing with the urethane-forming mixture, and to subsequently close it by means of the mould. However, it is also possible, according to the invention, to first close the housing by means of the mould and to subsequently fill the enclosed space thus formed with the urethane-forming mixture through apertures in the wall of the housing or in the mould.

Finally, the invention relates to a luminaire for a tubular discharge lamp manufactured according to this method.

A method of manufacturing a luminaire is known from U.S. Pat. No. 4,419,719. From this specification it is known that the polyurethane must adhere well to the wall of the housing which is generally formed from a metal. However, no solution is provided for the problem posed by the adhesion of the polyurethane to the mould, which would also consists of metal. According to the prior art, a liquid release-agent is sprayed onto the mould after each production cycle, which is objectionable in the case of a continuous production process.

According to the invention, a method of manufacturing a luminaire for a tubular discharge lamp is characterized in that at least that part of the mould surface which contacts the polyurethane is covered with, in succession, a silver layer and a monolayer of an alkylmercaptan.

BRIEF DESCRIPTION OF THE DRAWINGS

The invention will now be described in greater detail by means of an embodiment and with reference to a drawing in which.

DETAILED DESCRIPTION OF THE INVENTION

Figure 1:
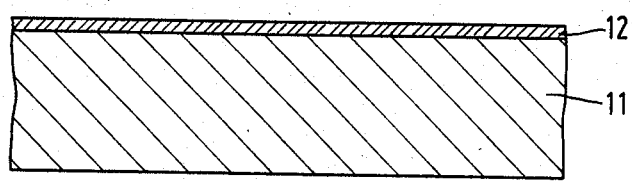
FIG. 1 is a cross-sectional view of part of a mould according to the invention.
Figure 2:
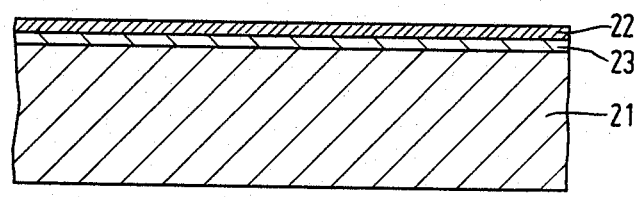
FIG. 2 is a cross-sectional view of part of another mould according to the invention.

In FIG. 1, reference numeral 11 denotes a portion of a metal mould which is covered with a monolayer 12 of octadecyl mercaptan. The layer thickness is approximately 3 to 4 n.m. In FIG. 2, reference numeral 21 denotes a portion of a mould of aluminium or steel which is covered, in succession, with a 0.2 μm silver layer 23 and a monolayer 22 of octadecylmercaptan. Such moulds can be used for the manufacture of shaped polyurethane products using a urethane forming mixture.

A urethane-forming mixture comprises at least a polyol having active hydroxyl groups and an isocyanate compound. A suitable composition comprises, for example, 35% by weight of polypropylene oxide having 2 hydroxyl groups per molecule, 35% by weight of polypropylene oxide having 3 hydroxyl groups per molecule and 30% by weight of toleuene diisocyanate. If desired, solvents and a catalyst may be added, as described, for example, in GB Pat. No. 2,035,194. The urethane-forming mixture can be made to foam by means of a blowing gas, for example, FREON.

Moulded products of polyurethane were formed and cured in contact with an aluminium mould, in accordance with the invention, in less than 60 seconds. After the product had been removed from the mould no polyurethane was found to stick to the mould, not even when the procedure was repeated dozens of times.

Figure 3:
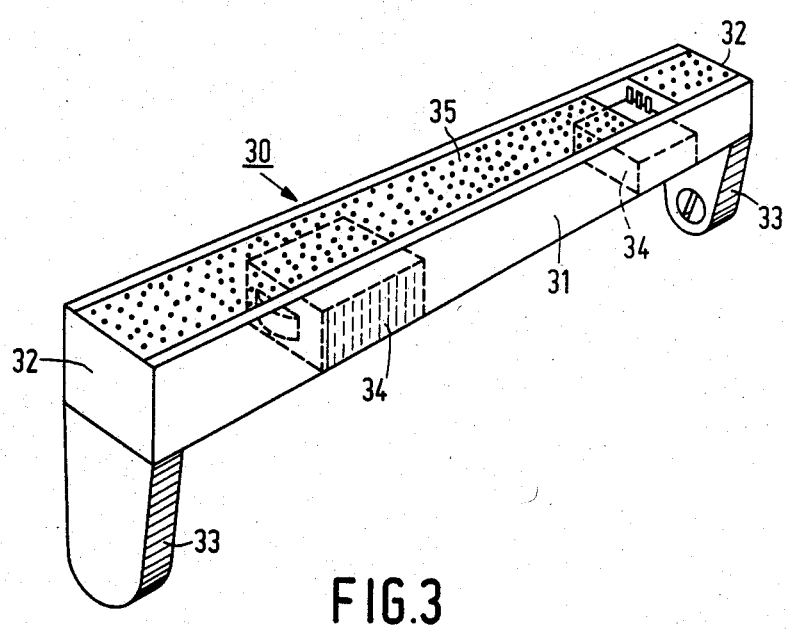
FIG. 3 is a perspective view of a luminaire for a tubular discharge lamp according to the invention.

FIG. 3 shows a luminaire 30 for a tubular discharge lamp (not shown). An elongate, thin-walled housing 31, having a generally U-shaped cross-section, is closed at both ends by means of end walls 32. At the ends there are the fittings 33 to accommodate the discharge lamp. Within the housing 31 there are electric components 34 (e.g. an electric ballast and a starter) and electric wiring which is not shown. The housing 31 is filled with a polyurethane foam 35 which keeps the electric components 34 and the wiring in place and which gives the housing great mechanical strength. Naturally, a luminaire according to the invention may be made suitable to accommodate several tubular discharge lamps.

In addition to the manufacture of a luminaire, a mould and a method according to the invention may also be used efficiently for the manufacture of moulded products for use in the car industry and for manufacturing house hold appliances in which polyurethane is used as a thermal insulation material.

What is claimed is:

1. A mould which is suitable for manufacturing a product, the surface of which product consists at least partly of polyurethane, at least that part of the mould surface which contacts the polyurethane consisting of a metal and being provided with a release agent, characterized in that the release agent comprises a monolayer of an alkylmercaptan.

2. A mould as claimed in claim 1, in which the part of the mould which contacts the polyurethane is manufactured from steel or aluminium, characterized in that at least the part of the steel or aluminium surface which contacts the polyurethane is covered with, in succession, a silver layer and then the monolayer of the alkylmercaptan.

3. A mould as claimed in claim 1, characterized in that an alkylmercaptan is used whose alkylgroup comprises at least 12 carbon atoms.

4. A mould as claimed in claim 3, characterized in that octadecylmercaptan is used as the release agent.

5. A method of manufacturing shaped polyurethane products, in which method a urethane-forming mixture is introduced into a mould, and reacted to form polyurethane, the mould comprising metal parts which are provided with a release agent, characterized in that the release agent comprises a monolyaer of an alkylmercaptan.

6. A method of manufacturing a luminaire for a tubular discharge lamp, in which an elongate housing having a substantially U-shaped cross-section is provided with electric components and wiring, whereupon the housing is filled with a urethane-forming mixture and closed by means of a mould; in the resulting enclosed space the urethane-forming mixture reacts to form a polyurethane, after which the mould is removed from the housing, characterized in that at least that part of the mould surface which contacts the polyurethane is covered with, in succession, a silver layer and a monlayer of an alkylmercaptan.

* * * * *